United States Patent [19]
Katz

[11] Patent Number: 5,556,690
[45] Date of Patent: Sep. 17, 1996

[54] COMPOSITE RAVEL-FREE NEEDLEWORK FABRIC AND METHOD OF PRODUCING SAME

[75] Inventor: Marcella M. Katz, Los Angeles, Calif.

[73] Assignee: DeLaLott Corporation, Los Angeles, Calif.

[21] Appl. No.: 517,283

[22] Filed: Aug. 21, 1995

[51] Int. Cl.$^6$ .................................................. B32B 3/10
[52] U.S. Cl. ......................... 428/137; 156/291; 156/324; 156/322; 428/198; 428/229; 428/233; 428/236; 428/247; 428/255
[58] Field of Search .................................. 428/233, 236, 428/247, 255, 131, 137, 198, 229; 156/291, 322, 324

[56] References Cited

U.S. PATENT DOCUMENTS

| 4,623,573 | 11/1986 | Katz | 428/109 |
| 4,668,325 | 5/1987 | Katz | 156/322 |
| 4,778,706 | 10/1988 | Katz | 428/131 |

*Primary Examiner*—James J. Bell
*Attorney, Agent, or Firm*—Philip D. Junkins

[57] ABSTRACT

A composite laminated, non-distortable needlework fabric material comprised of a primary layer of non-elastic, open-mesh woven needlework fabric material having a uniform gridwork pattern with mesh apertures defined by warp and weft threads and a relatively thin secondary mesh-stabilizing layer of sheer non-elastic, random-spun synthetic fiber sheet material coextensively interfaced with the primary layer and permanently bonded at its interfaced surface to the adhesive coated and impregnated crest portions of the warp and weft threads of the woven needlework material. The sheer secondary layer is bonded to the primary layer by an adhesive which in heated liquid form is: initially applied the crest portions of the warp and weft threads on the upper surface of a moving web of the primary layer of woven needlework fabric; permitted to cool and partially cure; and thereafter reactivated to a near melted state. The moving web of the primary layer of woven needlework fabric with reactivated adhesive is united at its upper surface, under pressure and cooling, with a moving web of the sheer random-spun synthetic fiber sheet material to form the composite laminated needlework fabric material.

11 Claims, 2 Drawing Sheets

COMPOSITE RAVEL-FREE NEEDLEWORK FABRIC AND METHOD OF PRODUCING SAME

BACKGROUND OF THE INVENTION

1. Field of the Invention

The present invention relates to needlework fabrics and canvas materials and their manufacture. More particularly, the invention relates to open-mesh woven textile and fabric materials which are intended to receive needle-directed yarn stitches and fine embroidery stitches for the purpose of creating stitchery designs. The end product stitchery designs are usually based upon published or self-created designs eye transferred from a count template, traced or hand sketched, or pre-imprinted on the woven fabric or canvas materials for counted thread or free-worked stitchery and embroidery needlework.

2. Description of the Prior Art

Needlework canvas, in its simplest form, is comprised of evenly spaced, durable, warp and weft (woof) threads woven into a textile in which the holes or apertures between the threads are equal to or larger in size than the threads themselves. Cotton or linen fiber strands, twisted together and coated with a sizing material (stiffening material such as starch), commonly comprise the threads of needlework canvas, particularly where the count of the canvas material (number of threads per inch) falls within the popular range of 7 to 18. Fine gauge needlework fabrics normally have counts within the range of 18 to 42 threads per inch (sometimes as many as 58 threads per inch) and are woven from silk or synthetic fiber threads. Polyacrylic plastic fibers comprise the synthetic fiber of choice in the manufacture of twisted-fiber synthetic threads used in the weaving of needlework fabrics.

The principal types of needlework fabrics are designated as "mono-", "double-", or "multiple-" thread woven materials. The "mono-" materials are woven with one thread on each side of each stitchery hole or aperture whereas "double-" or "duo-" materials are woven with two threads on each side of each major stitchery hole or aperture. A currently popular "multiple-" thread woven material (termed in the trade as "Evenweave" or "Aida"), utilized for fine embroidery work, is woven with four interlock threads on each side of each stitchery aperture.

There are two basic forms of mono-fabrics, i.e., "mono-floating" and "mono-interlock." In mono-floating needlework fabrics or canvases the warp and weft threads are merely woven over and under each other whereas with mono-interlock materials the warp threads (in fact) comprise two similar (weaker) threads that are knotted or twisted at each over and under crossing of the singular weft threads. Because of the weaving method, mono-floating needlework fabrics are subject to greater slippage between threads so that the mesh pattern of the fabric easily becomes distorted during the needlework stitchery operations. Further, mono-floating fabrics are greatly subject to raveling at the cut or free edges thereof. Mono-interlock woven fabrics are somewhat less subject to edge raveling but the smaller dual warp threads so weaken the fabric material that heavy amounts of sizing starches are used to coat the threads and provide body to the fabric. With such heavy application of sizing the holes and apertures of the material are rendered rough and frequently cause substantial needlework yarn wear and breakage during the stitching process and thereafter with repeated flexing of the completed stitchery fabric.

Multiple-thread needlework fabric materials, such as "Evenweave" or "Aida", present an even tighter weave pattern. The tight weave structure of such materials results in an appearance of the fabric (to the human eyes) as that of a single thread warp and single thread weft woven material with stitchery apertures that are smaller in size than the threads forming the fabric. In fact, the stitchery apertures of "Aida" fabrics are substantially equal in size to each of the multiple threads that form such fabrics. Even the "Evenweave" and "Aida" needlework fabrics are subject to edge raveling and some distortion during the long periods of stitchery application.

Canvas and fabric distortion, stretching, sagging, extension and creep and edge raveling constitute major problems to persons performing needlework stitchery and embroidery. If one closely observes needlework fabrics as stitchery is applied, it becomes obvious that the vertical and horizontal forces applied to the fabric threads (defining each aperture in the fabric) by the stitchery yarn-guiding needle and the stitchery yarn itself (passing through such apertures) are unequal. The absence of highly controlled and uniform yarn pull results in a wide variance of forces applied to the weave threads of the needlework fabric and causes shifting, crunching and/or tauting of such threads and causes differences in aperture size and configuration throughout the fabric with the ultimate result that the fabric and stitchery design becomes distorted. Interlock weaving of the needlework fabrics and sizing of the fabrics has only partially alleviated these problems. Distortion correction, after completion of the needlework piece, by straightening, or in some cases "blocking", the base needlework fabric (and the needlework it bears) may overcome some of the problems.

The well-known woven mono-floating, mono-interlock and double thread needlework canvas and fabric materials have continued to be used for most stitchery applications despite their many shortcomings and the problems they create for the needlework artisan. The principal shortcomings and problems include (as previously noted) edge raveling, canvas distortion, aperture irregularity and roughness, and thread shifting. Needlework pieces greatly vary in size from bolt width (24, 36, 40, 48, 54, 60 and 72 inches) and yardage lengths to small pieces (cut from bolt material) measuring only inches per side. Classically, great care has been required when cutting bolt width or yardage pieces of needlework canvas or fabric into smaller popular use size pieces to make certain that each cutting course or line follows a single line of holes or apertures of the material, i.e., between warp and weft threads, so that edge raveling is minimized. In most cases the needlework artisan has cut the canvas or fabric material so that a wide border area (outside of the proposed stitchery design and background area) is provided and a band of the boarder material is folded under and bound and/or cemented to the underside of the material to prevent raw edge raveling. Some canvas or woven fabric materials may require that it be held along its edge portions or be mounted in bulky and rigid frames.

To alleviate the classic problems of needlework material distortion and edge raveling, the present inventor developed and patented an improved composite laminated needlework material including a primary layer of woven needlework canvas or fabric material to which has been bonded a secondary layer of relatively thin sheer fabric material comprised of random-spun synthetic fiber material. This improved needlework material has been described and claimed in U.S. Pat. Nos. 4,623,573 and 4,778,706 and methodology for producing such material has been claimed in U.S. Pat. No. 4,668,325. The present invention, as to both the resulting needlework material per se and the methodology for producing same, comprises an improvement over some of the materials and the methodology of the above earlier patents, particularly the "Evenweave" and "Aida" type fabrics.

It is a principal object of the present invention to provide an improved needlework fabric material which is superior in its non-distortability, is dimensionally stable during the application of needle stitchery thereto, and can be cut into regular or irregular shapes without concern for edge raveling.

It is a further object of the invention to provide an improved composite laminated needlework fabric material in which the primary layer of woven apertured needlework material is free of yarn-damaging sizing materials and therefore does not rely on any such materials to assist in maintaining the dimensional stability of the finished composite material.

It is a still further object of the invention to provide an improved composite laminated needlework fabric material in which the primary layer of woven apertured needlework material may be comprised of multiple thread woven fabrics having complex weave patterns.

It is another object of the invention to provide a unique method for producing the improved non-distortable, dimensionally stable, and ravel-free composite laminated needlework fabric material of the invention.

Other objects and advantages of the invention will be apparent from the following summary and detailed description of the invention, taken together with the accompanying drawing figures.

SUMMARY OF THE INVENTION

The present invention relates to an improved needlework canvas or fabric materials and to the methodology for producing such materials. The needlework material of the invention is a flexible, non-distortable composite laminated sheet material comprised of a primary layer of non-elastic, open-mesh, woven needlework fabric which may be sizing-free (or sizing-adjusted depending on openness of the fabric weave) and which has bonded to one of its faces a relatively thin, non-elastic secondary mesh-stabilizing layer of sheer, random-spun synthetic fiber sheet material. The primary layer may be comprised of any of the well-known woven needlework fabric materials with the threads composed of cotton or linen fiber strands, silk or synthetic fiber materials and with the weave pattern of simple mono-floating, mono-interlock, double thread, or multiple thread structure. The invention is particularly applicable to the dimensional stabilization and ravel-free production of complex weave needlework fabrics such as "Aida" fabric where the threads are substantially free of undesired over sizing of materials.

To bond the sheer non-woven fabric secondary layer to the open-mesh primary layer a heated liquid synthetic adhesive material is first applied to one face of the bolt-width primary woven fabric material by light roller action (commonly referred to as a "kiss" coating operation) so that the apertures of the fabric do not fill with adhesive. The adhesive material quickly cures by travel of the coated primary layer at room temperature over a distance of 6–10 feet. The adhesive pretreated and coated primary layer is thereafter passed through an adhesive reactivation stage and thence interfaced via appropriate roller feed action with the secondary bolt-width non-woven secondary layer. Following the interfacing joinder of the secondary layer to the primary layer the composite fabric material is subjected to the application of pressure via pressure rolls which also cool the composite dual-layered material to room temperature to form the final laminated needlework material of the invention with the interlayered adhesive being fully cured. The laminated material is thereafter accumulated on a roll as finished goods which may be marketed in roll form or cut unto ravel-free strips or pieces of any desired size and shape.

The open-mesh primary layer, sheer non-woven secondary layer and resulting final laminated needlework material pass through the various stages of the laminating process at a travel rate of between 20 to 50 yard-lengths of material per minute. The resulting composite laminated needlework material is non-distortable because the warp and weft threads of the primary layer are held in proper woven alignment and spacing through their bonding to the secondary mesh-stabilizing layer. Further, the composite material does not ravel at its edges. The secondary layer of the material is of such sheerness that it is semi-transparent so that the holes or apertures of the open-mesh primary layer remain visible and distinct to the needlework artisan and the secondary layer is relatively thin with respect to the primary layer so that it is easily penetrated by the yarn or thread bearing stitchery needle.

The sheer secondary layer may be bulk color tinted prior to lamination to provide color contrast with respect to the primary layer so that the apertures of the primary layer in effect are framed and stand out to promote eye-ease in the direction of the needlework needle. Light tinting of the secondary layer does not limit its sheerness and semi-transparency. Alternatively, as a means for providing color contrast and framing of the apertures, the primary layer of canvas can be pre-colored to contrast with an untinted or contrast tinted sheer secondary layer.

BRIEF DESCRIPTION OF THE DRAWING FIGURES

Figure 2:
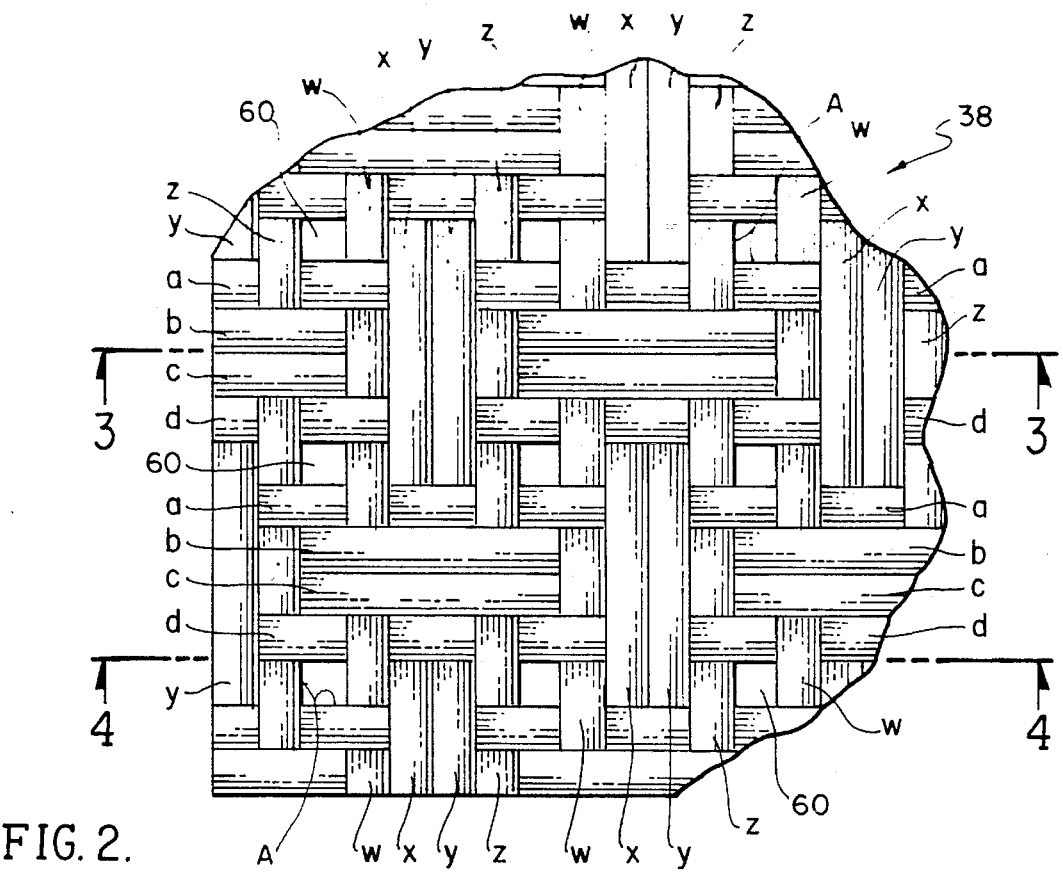
FIG. 2 is an enlarged top plan view of a segment of a composite laminated edge and corner piece of needlework fabric material produced in accordance with the present invention with the open-mesh primary layer comprising (as an example of a woven fabric applicable to the invention) multiple-thread "Aida" type woven fabric material.
Figure 3:
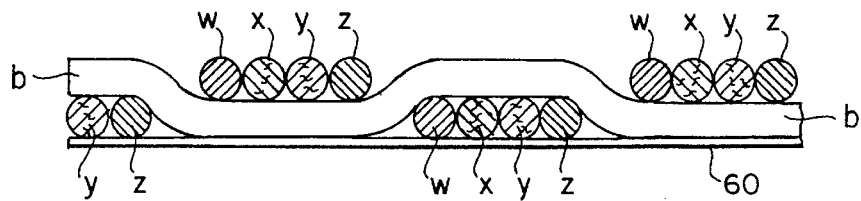
Figure 4:
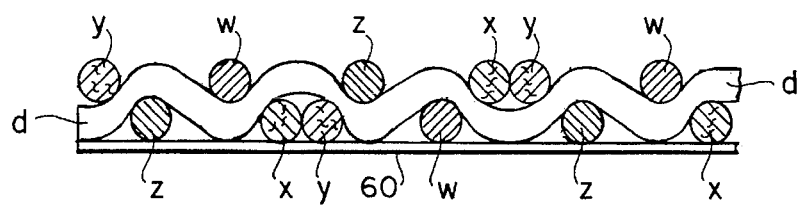

FIG. 3 is an enlarged sectional view of the composite laminated needlework fabric material of FIG. 2 taken along line 3—3 of FIG. 2 and showing at such section the repeating arrangement of four adjacent parallel warp threads of the multiple-thread woven fabric material; and FIG. 4 is an enlarged sectional view of the composite laminated needlework fabric material of FIG. 2 taken along line 4—4 of FIG. 2 and showing at such section the repeating arrangement of the four warp threads of the woven fabric material interlocked by a weft thread.

PREFERRED EMBODIMENTS OF THE INVENTION

Figure 1:
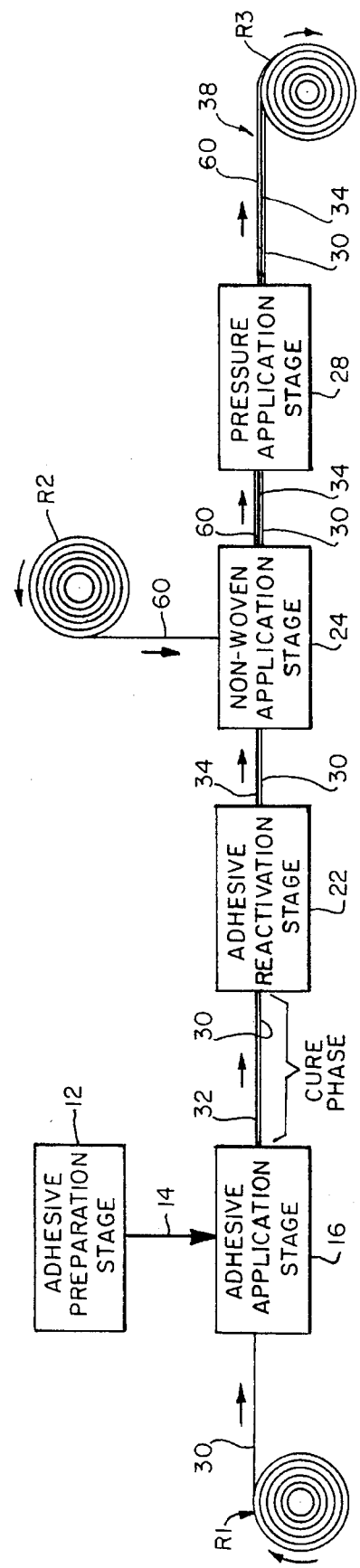
FIG. 1 is a somewhat diagrammatic showing of a preferred method of applying a relatively thin non-woven mesh-stabilizing layer (web) of sheer random-spun synthetic fiber material to a primary layer (web) of woven needlework fabric material to form the composite laminated ravel-free needlework material of the present invention.

Referring initially to FIG. 1 of the drawings, there is shown, in somewhat diagrammatic fashion, a preferred version of the method of applying a sheer and relatively thin mesh-stabilizing secondary layer of random-spun synthetic fiber sheet material to a primary layer of open-mesh woven needlework fabric material to form the improved composite laminated mesh-stabilized and ravel-free needlework material of the invention as shown in FIGS. 2–4. In accordance with the methodology illustrated in FIG. 1 a bolt-width web of non-elastic, open-mesh woven needlework fabric 30, supplied via fabric roll or spool R1, is fed as a primary laminate layer to adhesive application stage 16. Appropriate adhesive-forming resin material in adhesive preparation stage 12 is heated to form a liquid synthetic resin adhesive which is delivered through a conduit 14 to the adhesive application stage 16. The heated liquid adhesive may be of a hot melt, solvent based or aqueous based type, Thus, latex based, acrylic based, polyester based, polyamide based and vinyl based thermoplastic adhesives may be used to bind the secondary layer of synthetic fiber sheet material to the primary layer of woven needlework fabric material. A preferred adhesive for use in the method of the invention is a hot melt ethylene-vinyl-acetate based thermo-plastic adhesive.

The liquid adhesive material, flowing from conduit 14 at a temperature of between about 175 to about 205 degrees C, is applied (within the adhesive application stage or zone 16) to the upper surface of the moving web of the bolt-width primary layer of woven needlework fabric material 30 in a carefully metered amount by light roller action (commonly referred to as a "kiss" coating operation). Thus, the liquid adhesive material is applied carefully to the crest portions of the warp and weft threads of the primary layer of woven fabric material so that the threads are only impregnated and coated at the crest portions whereby the apertures of the woven fabric do not fill with adhesive. The moving web of primary woven needlework fabric 30 with the applied adhesive coating 32 leaves the adhesive application stage or zone 16 and moves over a distance of 6 to 12 feet through an ambient temperature space for cooling and setting the adhesive (cure phase).

Following the cure phase, the moving web of needlework fabric (with its set adhesive coating) is introduced to an adhesive reactivation stage or zone 22 wherein the adhesive coating is softened by accurately heating same to a temperature near but less than the liquefaction temperature of the adhesive. The moving web of primary woven needlework fabric 30, with its upper softened adhesive coating 34, is next introduced to a non-woven application stage or zone 24 wherein such web is united (at its adhesive impregnated and coated side) with a moving web of a relatively thin secondary layer of sheer non-elastic, random-spun synthetic fiber sheet material 60 of like bolt-width supplied via a roll or spool R2 of such sheet material. Typically the random-spun synthetic fiber sheet material may be made synthetic resins selected from the group consisting of polyamides and polyesters.

The resulting moving web material leaving the non-woven application zone 24 is a composite comprised of the primary layer of woven needlework fabric 30 and the secondary layer of sheer random-spun synthetic fiber sheet material 60 with the intermediate bonding layer of adhesive material 34. This moving composite web is next introduced to a pressure application stage or zone 28 wherein the material is passed between one or more pairs of opposing cold pressure rolls to complete the lamination of the secondary layer of sheer non-woven fabric material to the primary layer of woven needlework and cool the material to ambient temperature. The fully processed moving web 38 of composite laminated non-distortable, needlework fabric material is finally accumulated as a spooled roll R3. As previously indicated, the moving webs of fabric material are transported through the stages of the processing method at a travel rate of between 20 to 50 yard-lengths per minute with the optimum rate dependent upon physical characteristics of the layers of processed materials, the bolt width of such materials and the characteristics of the adhesive.

The composite laminated needlework fabric produced in accordance with the present invention is non-distortable because the warp and weft threads of the primary layer of woven fabric material are held in proper woven alignment and spacing through their bonding to the secondary mesh-stabilizing layer of non-woven, random-spun synthetic fiber sheet material. Most importantly, the composite laminated needlework fabric of the invention does not ravel at its edges. The bonding method precludes the introduction of adhesive into the apertures of the primary open-mesh woven fabric material. The secondary layer of the composite laminated material is of such sheerness that it is transparent so that the holes or apertures of the open-mesh primary layer remain visible and distinct to the needlework artisan.

In FIG. 2 of the drawings there is shown in an enlarged top plan view a segment of a composite laminated edge and corner piece of needlework fabric material 38 produced in accordance with the present invention with the open-mesh primary layer comprising the popular multiple-thread "Aida" type woven fabric material. As will be noted, the primary (top) layer of woven fabric material is comprised of a repeating intertwining weave arrangement of four adjacent parallel warp threads w, x, y and z. Such arrangement of warp threads is also made obvious by reference to FIG. 3 which is a sectional view of the composite laminated needlework fabric material of FIG. 2 taken along line 3—3 of FIG, 2. The primary layer of woven fabric material is further comprised of a repeating interlocked weave arrangement of four adjacent parallel weft threads a, b, c and d. FIG, 4 is an enlarged sectional view of the composite laminated needlework fabric material of FIG. 2 taken along line 4—4 of FIG. 2 and shows the repeating arrangement of four warp threads interlocked by a weft thread d. FIGS. 3 and 4 show the secondary layer of non-woven, random-spun synthetic fiber sheet material 60 bonded to the adhesive coated and impregnated crests of the threads of the primary layer of the woven fabric material. FIG. 2 shows the apertures A of the woven fabric material as defined by the warp and weft threads of the material.

In the specification and drawing figures there has been set forth preferred embodiment of the method and composite laminated needlework material of the present invention and although specific terms have been employed, they are used in a generic and descriptive sense only and not for the purposes of limitation, the scope of the invention being defined in the following claims.

What is claimed is:

1. A composite laminated, non-distortable, needlework fabric material having ravel-free edges and comprised of:

a) a primary layer of non-elastic, open-mesh woven needlework fabric material having a uniform gridwork pattern with mesh apertures defined by the warp and weft threads of said fabric, said apertures being equal to or larger in their major dimension than the threads forming said fabric material, and said material presenting an exposed surface and a laminate interface surface with the crest portions of said threads on the interface surface being pre-coated and impregnated with a synthetic resin adhesive; and b) a relatively thin secondary mesh-stabilizing layer of sheer non-elastic, random-spun synthetic fiber sheet material coextensively interfaced with said primary layer at its interface surface and permanently bonded to the crest portions of the warp and weft threads of said woven needlework material by said adhesive, the apertures of said primary layer being functionally free of said adhesive and the gridwork design of said primary layer remaining distinctly visible through said secondary layer, said laminated needlework fabric material being adaptable for receiving needlework designs and patterns imprinted on either of its outer surfaces.

2. The composite laminated, non-distortable, needlework fabric material as claimed in claim 1 wherein the primary layer of non-elastic, open-mesh woven needlework fabric material is woven with groups of multiple and parallel warp and weft threads defining the apertures of said material.

3. The composite laminated, non-distortable, needlework fabric material as claimed in claim 1 wherein the relatively thin secondary mesh-stabilizing layer of sheer non-elastic, random-spun synthetic fiber sheet material is color tinted to provide a color contrast between the threads of said open-mesh needlework fabric material of said primary layer and thereby provide clear definition to the apertures of said primary layer.

4. The composite laminated, non-distortable, needlework fabric material as claimed in claim 1 wherein the threads of said open-mesh fabric material of the primary layer are color tinted to provide a color contrast between said threads and the sheer fabric material of said secondary layer and thereby provide clear definition to the apertures of said primary layer.

5. The composite laminated, non-distortable, needlework fabric material as claimed in claim 1 wherein the open-mesh fabric material of the primary layer is a multiple-thread "Aida" or "Evenweave" woven fabric material.

6. A composite laminated, non-distortable, needlework fabric material having ravel-free edges and comprised of:
   a) a primary layer of non-elastic, open-mesh woven needlework fabric material woven with groups of intertwining multiple and parallel warp and weft threads forming a uniform gridwork pattern with mesh apertures by the groups of warp and weft threads of said fabric, said apertures being equal to or larger in their major dimension than the threads forming said fabric, and said material presenting an exposed surface and a laminate interface surface with the crest portions of said threads on the interface surface being pre-coated and impregnated with a synthetic resin adhesive; and
   b) a relatively thin secondary mesh-stabilizing layer of sheer non-elastic, random-spun synthetic fiber sheet material coextensively interfaced with said primary layer at its interface surface and permanently bonded to the crest portions of the warp and weft threads of said woven needlework fabric material by said adhesive, the apertures of said primary layer of said woven needlework fabric material being functionally free of said adhesive and the gridwork design of said primary layer remaining distinctly visible through said secondary layer, said secondary layer of synthetic fiber sheet material at its outer surface and said primary layer of woven needlework fabric material at its outer surface being adaptable for receiving imprinted thereon needlework designs and patterns.

7. The composite laminated, non-distortable, needlework fabric material as claimed in claim 6 wherein the open-mesh fabric material of the primary layer is a multiple-thread "Aida" or "Evenweave" woven fabric material.

8. A method for the production of a composite laminated, non-distortable, needlework fabric material having ravel-free edges which comprises:
   a) applying a heated liquid synthetic resin adhesive uniformly to the crest portions of the warp and weft threads of a moving web of a primary layer of non-elastic, open-mesh, woven needlework fabric material, said fabric material having a uniform gridwork pattern with mesh apertures defined by said threads;
   b) continuing the movement of said web of said needlework fabric material bearing said adhesive through a cooling zone to set said adhesive;
   c) continuing the movement of said web of said needlework fabric material bearing said set adhesive through a heated adhesive reactivation zone to soften said adhesive to a temperature near but less than its liquefaction temperature;
   d) uniting the moving web of said needlework fabric material bearing said softened adhesive at its adhesive bearing side with a web of a relatively thin secondary mesh-stabilizing layer of sheer non-elastic, random-spun synthetic fiber sheet material moving at the same speed as said web of said needlework fabric material to form a moving composite web of said primary layer of needlework fabric material and said secondary layer of sheer sheet material;
   e) applying pressure to the united moving composite web of said primary layer and said secondary layer with cooling of said composite web to bond said secondary layer to said primary layer to form said composite laminated needlework fabric material; and
   f) spooling said moving composite laminated fabric material.

9. The method for the production of a composite laminated, non-distortable, needlework fabric material as claimed in claim 8 wherein the heated liquid synthetic resin adhesive is an adhesive material selected from the group comprising latex based, acrylic based, polyester based, polyamide based and vinyl based thermoplastic adhesives.

10. The method for the production of a composite laminated, non-distortable, needlework fabric material as claimed in claim 8 wherein said moving web of a primary layer of said woven needlework fabric material is derived from a spool of said material and the heated liquid synthetic resin adhesive is applied to the crest portions of the warp and weft threads on the upper side of said moving web of said primary layer of woven needlework fabric material by a metering roll.

11. The method for the production of a composite laminated, non-distortable, needlework fabric material as claimed in claim 10 wherein the web of said secondary layer of sheer synthetic fiber sheet material is derived from a spool of said sheet material and united to the upper side of said moving web of said primary layer of woven needlework fabric material.

* * * * *